United States Patent
Kumagai (10) Patent No.: US 7,950,731 B2
(45) Date of Patent: May 31, 2011

(54) ROOF HEADER STRUCTURE

(75) Inventor: Koushi Kumagai, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 265 days.

(21) Appl. No.: 12/084,778

(22) PCT Filed: Nov. 2, 2006

(86) PCT No.: PCT/JP2006/321987
§ 371 (c)(1),
(2), (4) Date: May 9, 2008

(87) PCT Pub. No.: WO2007/055153
PCT Pub. Date: May 18, 2007

(65) Prior Publication Data
US 2009/0284047 A1     Nov. 19, 2009

(30) Foreign Application Priority Data
Nov. 9, 2005   (JP) ................................ 2005-324897

(51) Int. Cl.
*B62D 25/06* (2006.01)
(52) U.S. Cl. ..................................................... 296/210
(58) Field of Classification Search ................ 296/102, 296/193.12, 210, 213
See application file for complete search history.

(56) References Cited

U.S. PATENT DOCUMENTS

| | | | | |
|---|---|---|---|---|
| 2,746,789 A | * | 5/1956 | Ridgway | 52/483.1 |
| 3,050,335 A | * | 8/1962 | Schubach | 296/213 |
| 3,700,277 A | * | 10/1972 | Montean, Jr. | 296/104 |
| 4,214,789 A | * | 7/1980 | Katz et al. | 296/186.3 |
| 4,311,744 A | * | 1/1982 | Watanabe | 428/83 |
| 4,660,882 A | * | 4/1987 | Hensiek | 296/104 |
| 5,000,507 A | | 3/1991 | Baxter | |
| 5,318,338 A | | 6/1994 | Ikeda | |
| 5,795,014 A | * | 8/1998 | Balgaard | 296/210 |
| 6,347,829 B1 | * | 2/2002 | Hanyu | 296/210 |

(Continued)

FOREIGN PATENT DOCUMENTS
DE     3414844     10/1985

(Continued)

OTHER PUBLICATIONS

Office Action from the German Patent Office for German Application No. 11 2006 002 958.4-56, dated Oct. 29, 2009.

*Primary Examiner* — Glenn Dayoan
*Assistant Examiner* — Paul A Chenevert
(74) *Attorney, Agent, or Firm* — Finnegan, Henderson, Farabow, Garrett & Dunner, LLP (57) ABSTRACT

A roof header structure which has a simple structure to allow effective reinforcement can be obtained.

In an upper header panel 24, a bead 28 is formed which continues in the vehicle width direction, being the deepest in the central portion in the vehicle width direction, the depth being gradually reduced toward both ends in the vehicle width direction. The protruding end (the lower end) of the bead 28 is joined to the lower header panel 26 in the central portion in the vehicle width direction. The bead 28 reinforces the upper header panel 24, and further reinforces the entire front header part 22, thus with a simple structure, the front header part 22 can be reliably reinforced.

6 Claims, 11 Drawing Sheets

U.S. PATENT DOCUMENTS

| | | | |
|---|---|---|---|
| 6,485,089 B2 * | 11/2002 | Hanyu | 296/203.01 |
| 6,543,841 B1 * | 4/2003 | Ohkubo | 296/210 |
| 7,213,874 B2 * | 5/2007 | Osterberg et al. | 296/210 |
| 7,407,222 B2 * | 8/2008 | Anderson et al. | 296/193.06 |
| 2004/0140695 A1 | 7/2004 | Garceau | |
| 2005/0253422 A1 * | 11/2005 | Tomozawa | 296/203.03 |
| 2007/0132281 A1 * | 6/2007 | Ehrlich | 296/210 |
| 2009/0174228 A1 * | 7/2009 | Duguet et al. | 296/214 |
| 2009/0206636 A1 * | 8/2009 | Nydam | 296/214 |
| 2009/0267387 A1 * | 10/2009 | Leroy et al. | 296/213 |

FOREIGN PATENT DOCUMENTS

| | | | |
|---|---|---|---|
| EP | 1132281 A2 * | 9/2001 | |
| JP | 57194163 A * | 11/1982 | |
| JP | 60050021 A * | 3/1985 | |
| JP | 4-126681 | 4/1992 | |
| JP | 2578156 | 11/1996 | |
| JP | 10167114 A * | 6/1998 | |
| JP | 2000318644 A * | 11/2000 | |
| JP | 2003-306166 | 10/2003 | |
| JP | 2003306167 A * | 10/2003 | |
| JP | 2005059649 A * | 3/2005 | |
| JP | 2005132214 A * | 5/2005 | |
| JP | 2009035244 A * | 2/2009 | |
| JP | 2009057032 A * | 3/2009 | |
| JP | 2009126345 A * | 6/2009 | |

* cited by examiner

ROOF HEADER STRUCTURE

TECHNICAL FIELD

The present invention relates to a roof header structure, and more particularly, relates to a roof header structure made up of one header panel or a plurality of header panels (for example, an upper header panel and a lower header panel) provided vertically with spaces between them in a vehicle.

BACKGROUND ART

In order to reinforce the roof header part of a vehicle, the Japanese Patent Publication No. 2578156, for example, discloses a vehicle body structure of automobile in which a reinforcing bar is joined to the rising wall on the rear side of the front roof rail, ranging from the junction part with the corner piece to the substantially central portion in the vehicle width direction.

Thus, conventionally it has been necessary that, for making reinforcement, a reinforcement member, such as a reinforcing bar like this, or the like, be newly provided, or the plate thickness of a component member of the roof header part be increased, thus a configuration which allows effective reinforcement to be obtained with a simple structure has been demanded.

DISCLOSURE OF THE INVENTION

Subjects to be Addressed by the Invention

The present invention has been made in view of the above-stated fact, and the subject thereof is to provide a roof header structure which allows effective reinforcement with a simple structure to be performed.

Measures for Addressing the Subjects

According an aspect of the invention, there is provided a roof header structure, comprising a header panel, or a plurality of header panels provided vertically with spaces between them and a bead provided at at least one of the header panels and continuing in a vehicle width direction, wherein a length of protrusion of the bead is gradually reduced from a central portion to end portions in the vehicle width direction.

Therefore, the header panel is reinforced by the bead. Also for the roof header structure, reinforcement is effectively performed with a simple structure which merely provides a bead at a header panel.

The number of header panels constituting the roof header structure is not particularly limited, and a single header panel may be used, however, generally, the roof header structure is often constituted by two, i.e., an upper header panel and a lower header panel. When a plurality of header panels constitute the roof header structure, at least one of them need to be provided with a bead.

In this manner, by making the length of protrusion of the bead in the end portions in the vehicle width direction shorter than that in the central portion in the vehicle width direction, a wider space can be allocated inside the vehicle cabin.

And yet, the length of protrusion of the bead is gradually reduced, and no abrupt change in the length of protrusion is given, thus a local reduction in strength can be avoided.

In the above-described aspect, the roof header structure may comprise a plurality of the header panels, and the bead may protrude toward a different header panel from the header panel at which the bead is provided, and the bead may be joined to the different header panel at a side in a direction of protrusion.

In this manner, by joining the bead to the header panel at the side in the direction of protrusion of the bead, more effective reinforcement can be performed than with the structure in which the bead is not joined to the header panel.

In the above-described aspect, the bead may be joined to the header panel provided at the side in the direction of protrusion of the bead, at a central portion in the vehicle width direction.

In this manner, with a simple structure in which the bead is merely joined to the header panel in the central portion in the vehicle width direction, the roof header structure can be more effectively reinforced.

In the above-described aspect, the roof header structure may comprise a plurality of the header panels, and the bead may protrude toward a different header panel from the header panel at which the bead is provided, and the bead may protrude such that it contacts with the different header panel at a side in a direction of protrusion, over a range extending in the vehicle width direction.

Thus, also in a configuration in which the bead and the header panel are contacted with each other over a range extending in the vehicle width direction, the roof header structure can be effectively reinforced.

This phrase "it contacts with the different header panel at a side in a direction of protrusion, over a range extending in the vehicle width direction", of course, covers a case where the bead is linearly contacted with the header panel in the vehicle width direction, however, besides this, it also covers a case where, for example, a plurality of point-like contact locations are provided in the vehicle width direction.

In the above-described aspect, the bead may protrude such that it contacts with the different header panel to which the bead is joined, over the entire vehicle width direction.

In the above-described aspect, the bead may be joined to the different header panel provided at the side in the direction of protrusion of the bead, at a plurality of locations in the vehicle width direction.

Because the bead is joined to the header panel in a plurality of locations in the vehicle width direction, the roof header structure can be more effectively reinforced.

In the above-described aspect, the bead may be joined to the different header panel provided at the side in the direction of the protrusion, at a central portion in the vehicle width direction and at locations at either side thereof.

In the above-described aspect, the header panel may be formed to curve convexly upward in the vehicle width direction, and the bead may protrude downward.

Thereby, the center-of-figure location for the roof header structure is moved toward the lower side of the header panel, in other words, the inside of the curve, thus, even in the case where, for example, a compressive force is applied to the header panel from both ends thereof in the vehicle width direction, buckling can be effectively prevented against the bending moment which is applied to the central portion in the width direction of the roof header structure.

In the above-described aspect, the header panel may comprise an upper header panel and a lower header panel, the lower header panel may be disposed at an inner side of the vehicle cabin, the upper header panel may be disposed above the lower header panel, and the bead may be provided at the upper header panel.

EFFECTS OF THE INVENTION

Because the present invention is configured as described above, the roof header structure can be effectively reinforced with a simple structure.

BEST MODE FOR CARRYING OUT THE INVENTION

Figure 1:
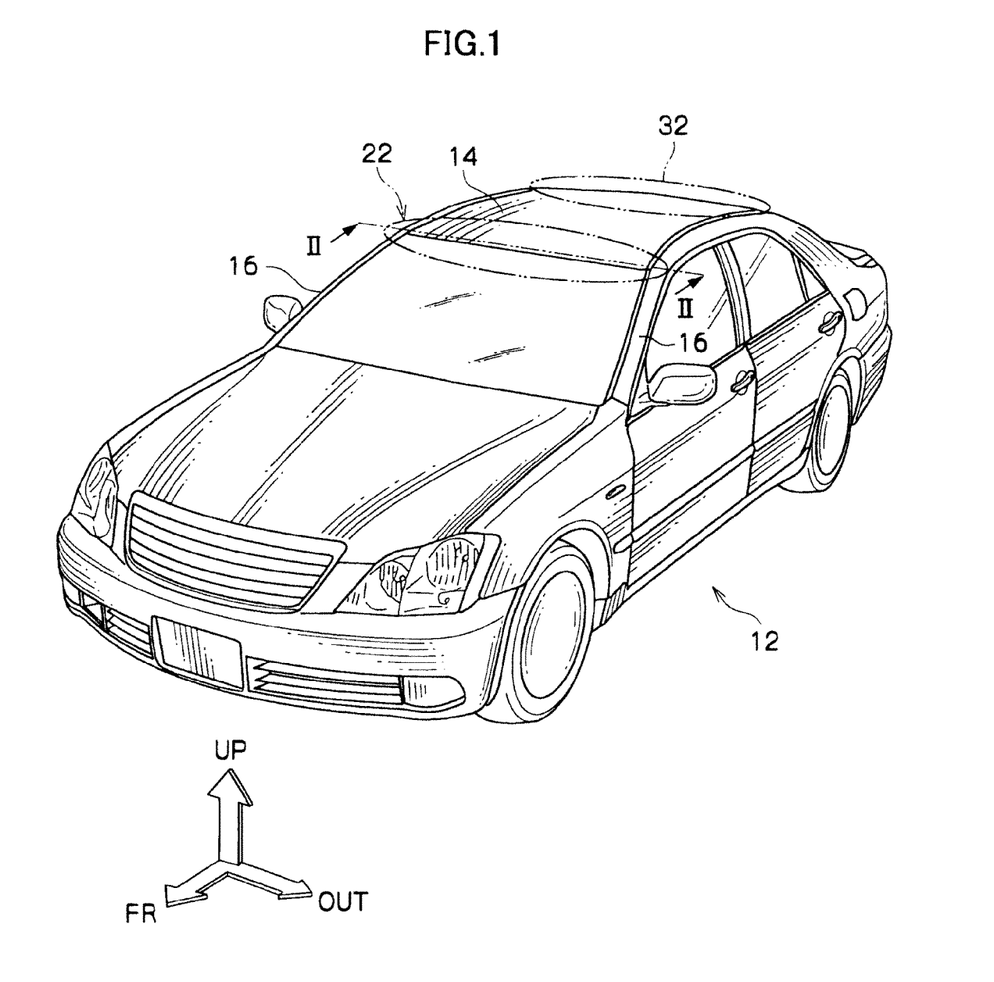
FIG. 1 is a perspective view illustrating an automobile to which an example of the present invention is applicable.

FIG. 1 shows an automobile 12 which is provided with a front header part 22 pertaining to a first embodiment of the present invention. In addition, FIG. 2 shows a specific structure of the front header part 22. In the embodiments below, as an example of the roof header structure of the present invention, a front header part 22 which is located in the front portion of a roof 14 of the automobile 12 is mentioned. In each drawing, the forward direction of the vehicle is represented with an arrow FR, the upward direction thereof is with an arrow UP, and the outward direction thereof in the vehicle width direction is with an arrow OUT.

The front header part 22 comprises a vertically disposed pair of an upper header panel 24 and a lower header panel 26 which connect front pillars 16 of the automobile. The upper header panel 24 and the lower header panel 26 are each upward convexly curved in accordance with the geometry of the roof 14 such that the strength thereof against the load imposed from above is improved, and a wider space can be allocated inside the vehicle cabin.

Figure 2A:
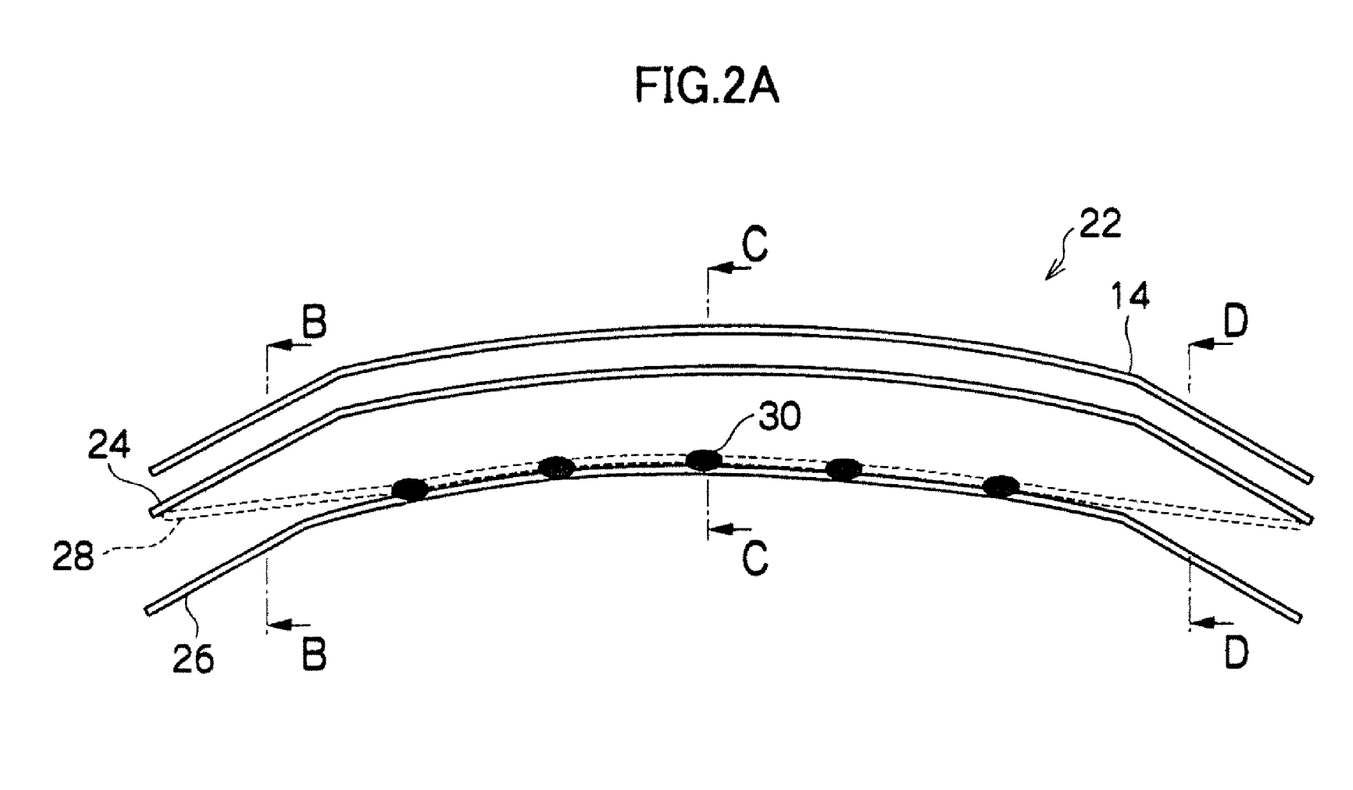
FIG. 2A is a cross-sectional view taken along line II-II in FIG. 1, schematically illustrating the front header part pertaining to the first embodiment of the present invention.
Figure 2B:
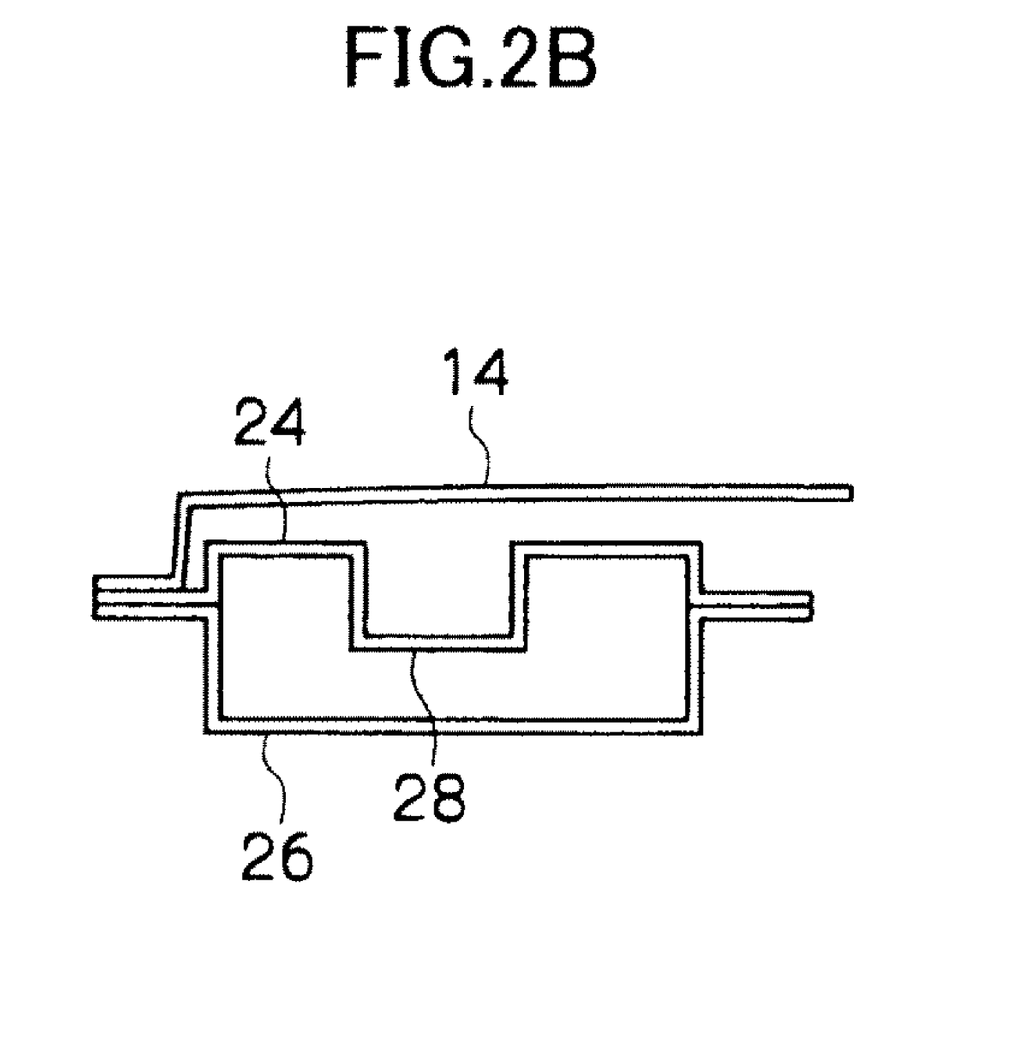
FIG. 2B is a cross-sectional view taken along line B-B in FIG. 2A, schematically illustrating the front header part pertaining to the first embodiment of the present invention.
Figure 2C:
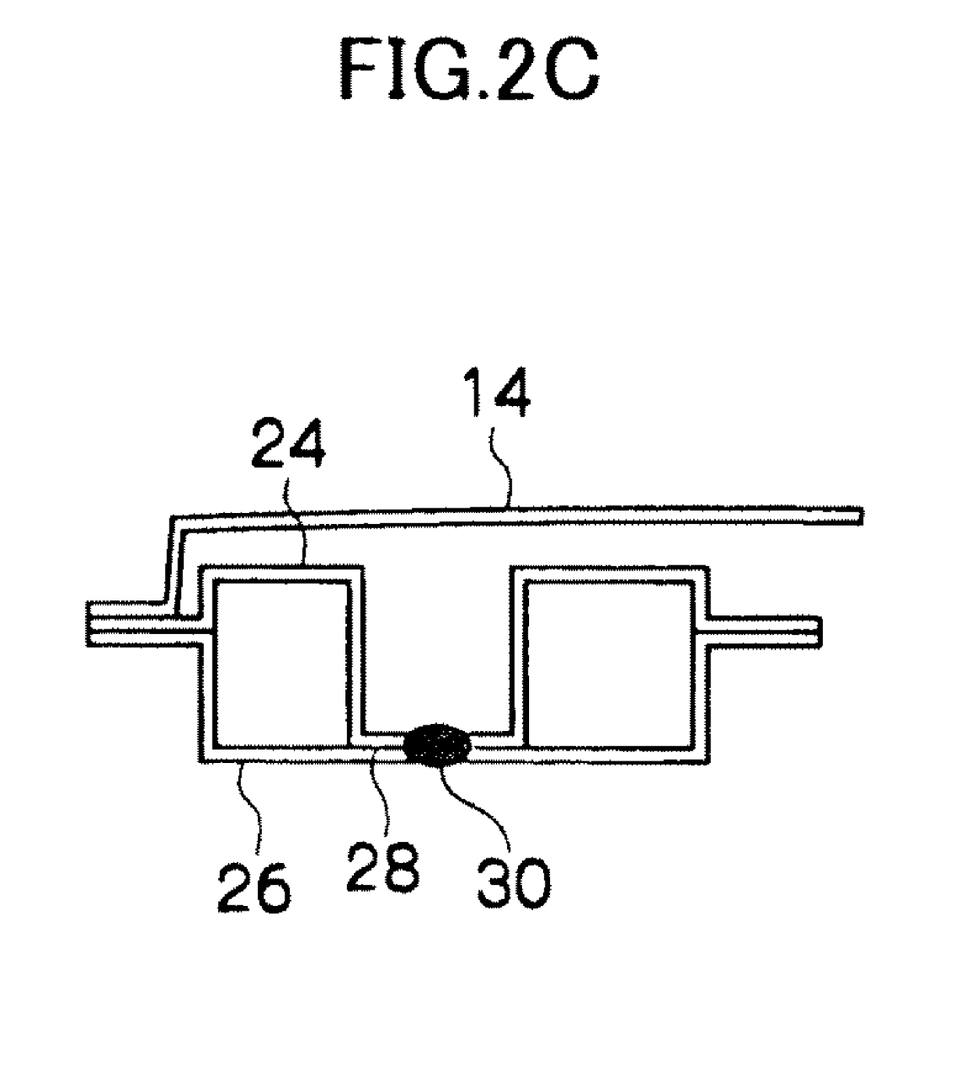
FIG. 2C is a cross-sectional view taken along line C-C in FIG. 2A, schematically illustrating the front header part pertaining to the first embodiment of the present invention.
Figure 2D:
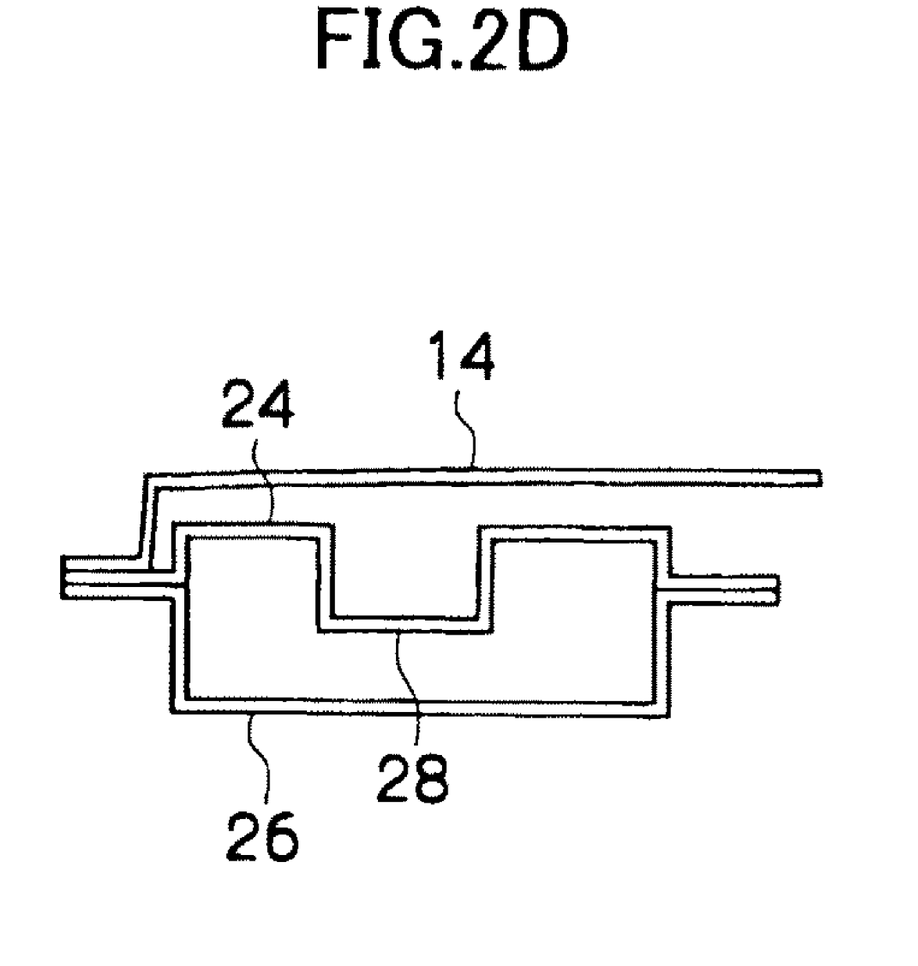
FIG. 2D is a cross-sectional view taken along line D-D in FIG. 2A, schematically illustrating the front header part pertaining to the first embodiment of the present invention.

As can be seen from FIG. 2A, in the upper header panel 24, a bead 28 which continuously runs in the vehicle width direction is formed. As shown in FIG. 2B to FIG. 2D, the bead 28 is configured by partially protruding downward from the upper header panel 24 in the central portion of the upper header panel 24 in the vehicle front-and-back direction, and the cross-section of the bead 28 is made substantially rectangular.

In addition, as can be seen also from FIG. 2C being compared with FIG. 2B and FIG. 2D, the depth of the bead 28 is the greatest in the central portion in the vehicle width direction, and is gradually reduced toward both ends in the vehicle width direction. And, the protruding end (the lower end) of the bead 28 is contacted with the lower header panel 26 in the central portion in the vehicle width direction, and this contact portion is provided as a junction part 30, where the bead 28 and the lower header panel 26 are joined to each other.

In the front header part 22 thus configured in the first embodiment, the upper header panel 24 is reinforced by the bead 28, and further, also for the entire front header part 22, reinforcement is achieved. Therefore, a simple structure in which the bead 28 is merely provided reliably reinforces the front header part 22, being capable of preventing an undesired deformation from being caused by an external force.

Figure 3:
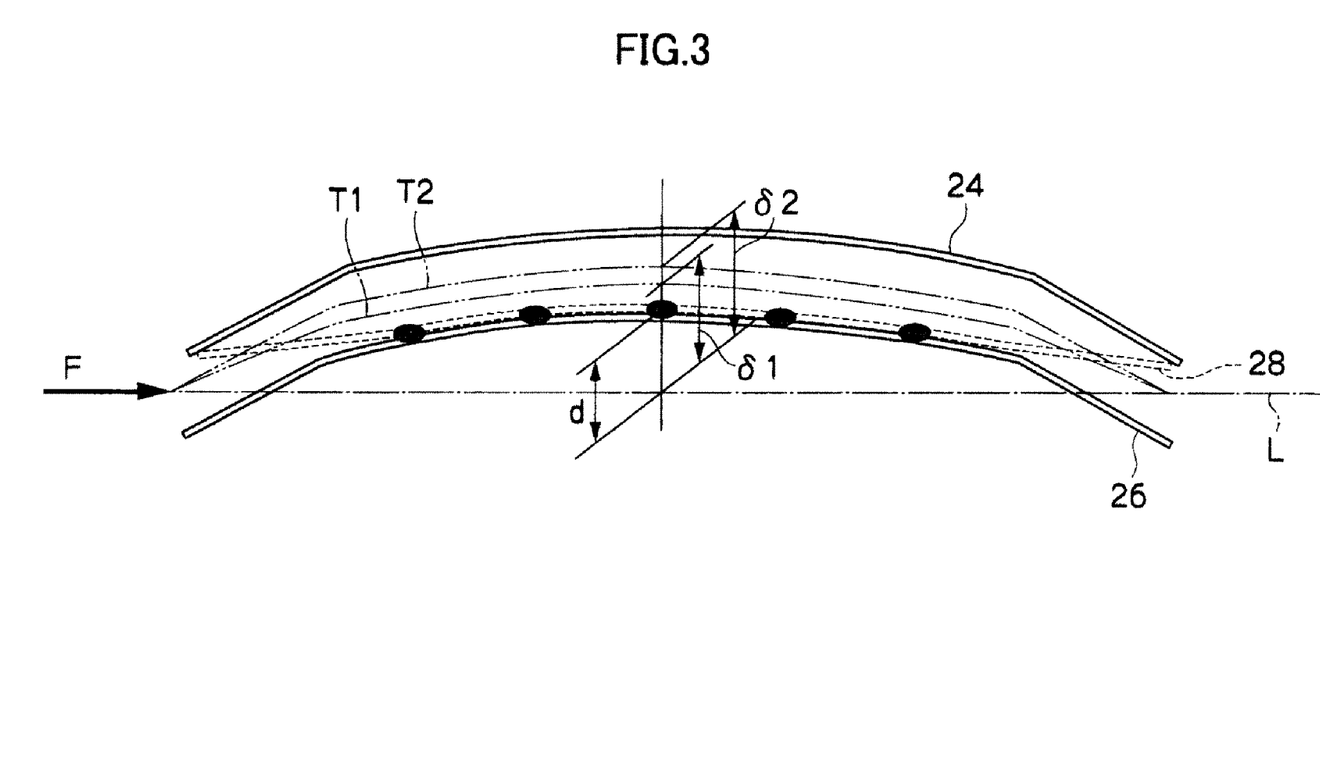
FIG. 3 is an explanatory drawing illustrating the center-of-figure location for the front header part pertaining to the first embodiment of the present invention in the case where a lateral force is applied thereto.

In FIG. 3, the center-of-figure location T1 for the front header part 22 which is provided with the bead 28 as in the present embodiment, and the center-of-figure location T2 of a front header part which is not provided with the bead 28 as a comparative example (having the same configuration as that for the present embodiment except for the bead 28 being not provided) are indicated with a long dashed double-short dashed line, respectively. From this FIG. 3, it can be seen that the center-of-figure location T1 for the front header part 22 in the present embodiment, which has the bead 28, is lower than the center-of-figure location T2 for the front header part which has no bead 28.

Here, particularly the case where, as shown in FIG. 3, a lateral force F is applied to the front header part 22 is considered. Because the front header part 22 is upward convexly curved, a bending moment is applied to the central portion of the front header part 22 in the vehicle width direction. Such bending moment is in proportion to the distance between a line connecting of both ends of the front header part 22 to each other (the line-of-action L of the lateral force F) and the center-of-figure location T1, T2 (the distance in the central portion in the vehicle width direction, which is denoted with δ1, δ2 in the drawing). Therefore, in the present embodiment with which the center-of-figure location T1 for the front header part 22 is lowered as described above, the bending moment is reduced, as compared to the configuration in which the center-of-figure location T2 is not lowered as shown in FIG. 3, thus buckling can be more reliably prevented.

And yet, there is no need for newly providing a member for reinforcement, and increasing the plate thickness for the upper header panel 24 and the lower header panel 26, thus a simple structure is provided, and no substantial increase in weight will be produced.

In the respective configurations which are provided or not provided with the bead 28, the stress σ2, σ1, and the amount of reduction in stress Δσ at the bottom surface of the front header part in the central portion are expressed as follows:

Stress when no bead is given $$\sigma 2 = F/A + F\delta 2(\delta 2 - d)/EI$$

Stress when bead is given $$\sigma 1 = F/A + F\delta 1(\delta 1 - d)/EI$$

Reduction in stress $$\Delta \sigma = F(\delta 2(\delta 2 - d) - \delta 1(\delta 1 - d))/EI$$

where

F: Lateral force applied to front header part from end portion
A: Cross-sectional area
E: Modulus of longitudinal elasticity
I: Second moment of area
$\delta 1$: Distance from line-of-action L for force F to center-of-figure location T1
$\delta 2$: Distance from line-of-action L for force F to center-of-figure location T2
d: Distance from line-of-action L for force F to junction part 30

From this, it can be seen that, even if the amount of lowering of the center-of-figure location is slight, a great amount of reduction in stress can be achieved.

FIG. 4 shows a front header part 62 in a second embodiment of the present invention. The second embodiment is configured to be the same as the first embodiment except that the geometry of a bead 68 in the second embodiment is different from that of the bead in the first embodiment. In the second embodiment, the same components, members, and the like are provided with the same reference numerals and signs as those in the first embodiment, and detailed explanation thereof is omitted.

The geometry of the bead 68 in the second embodiment is determined such that the bead 68 is contacted with the lower header panel 26 over the entire vehicle width direction.

Figure 4A:
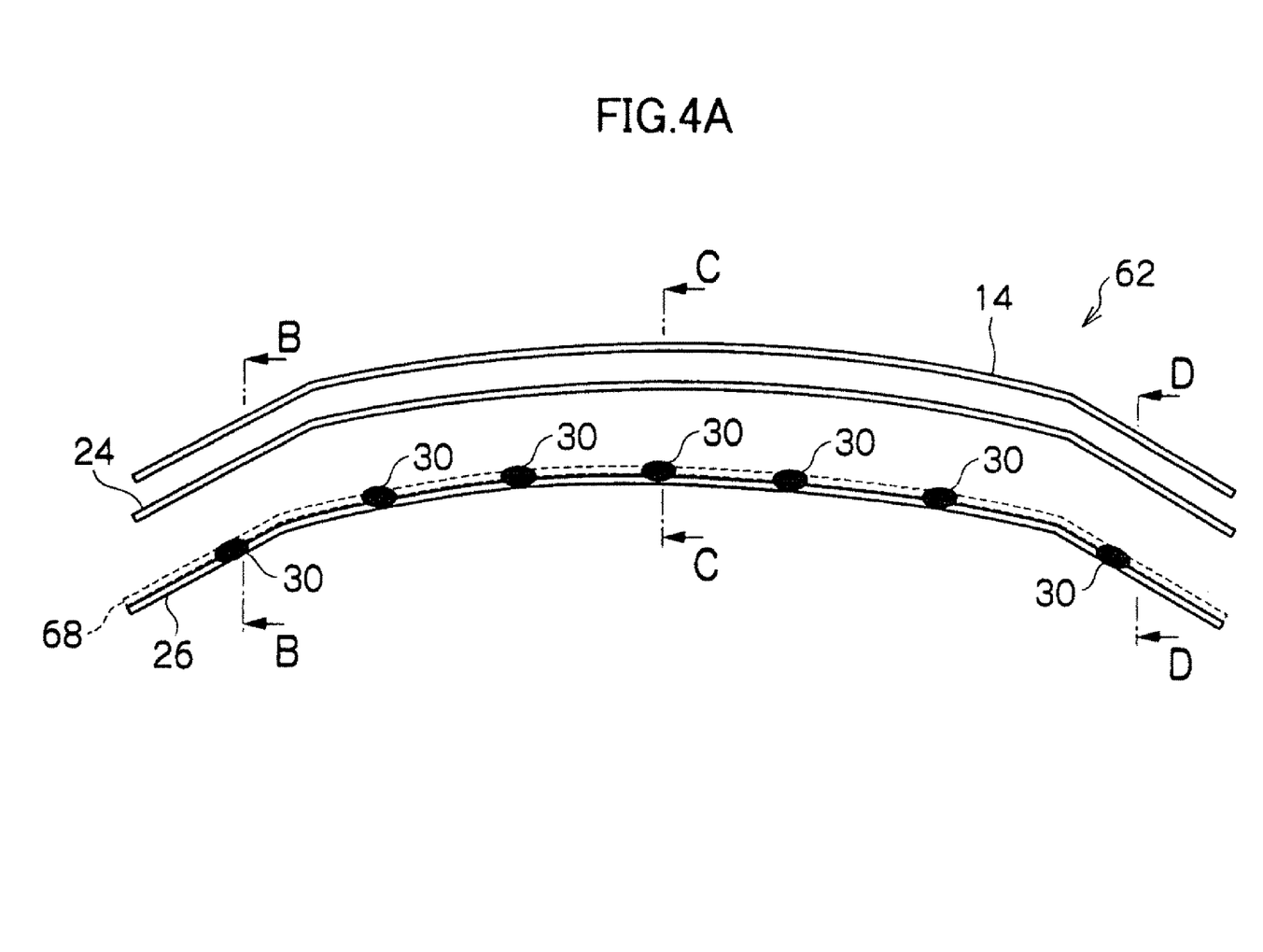
FIG. 4A is a cross-sectional view in the same location as that in FIG. 2A, schematically illustrating the front header part pertaining to the second embodiment of the present invention.
Figure 4B:
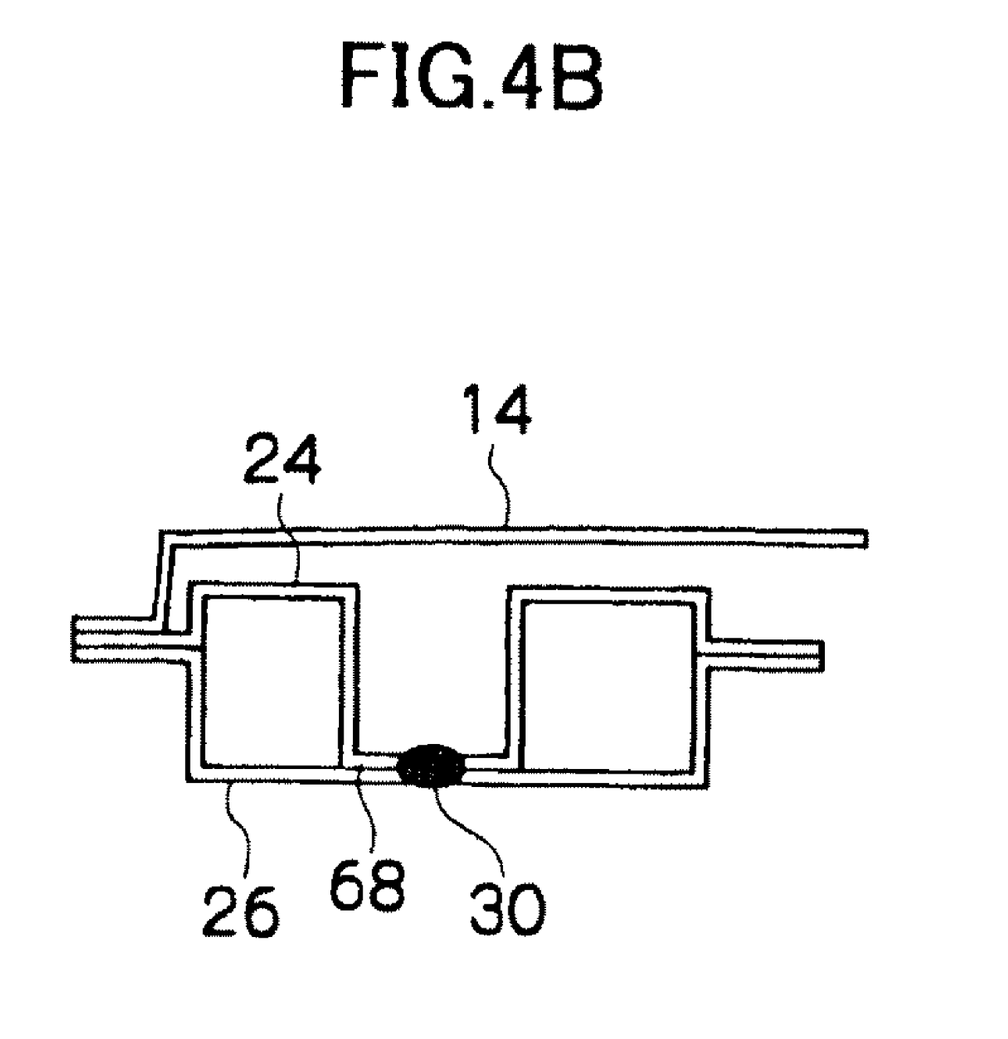
FIG. 4B is a cross-sectional view taken along line B-B in FIG. 4A, schematically illustrating the front header part pertaining to the second embodiment of the present invention.
Figure 4C:
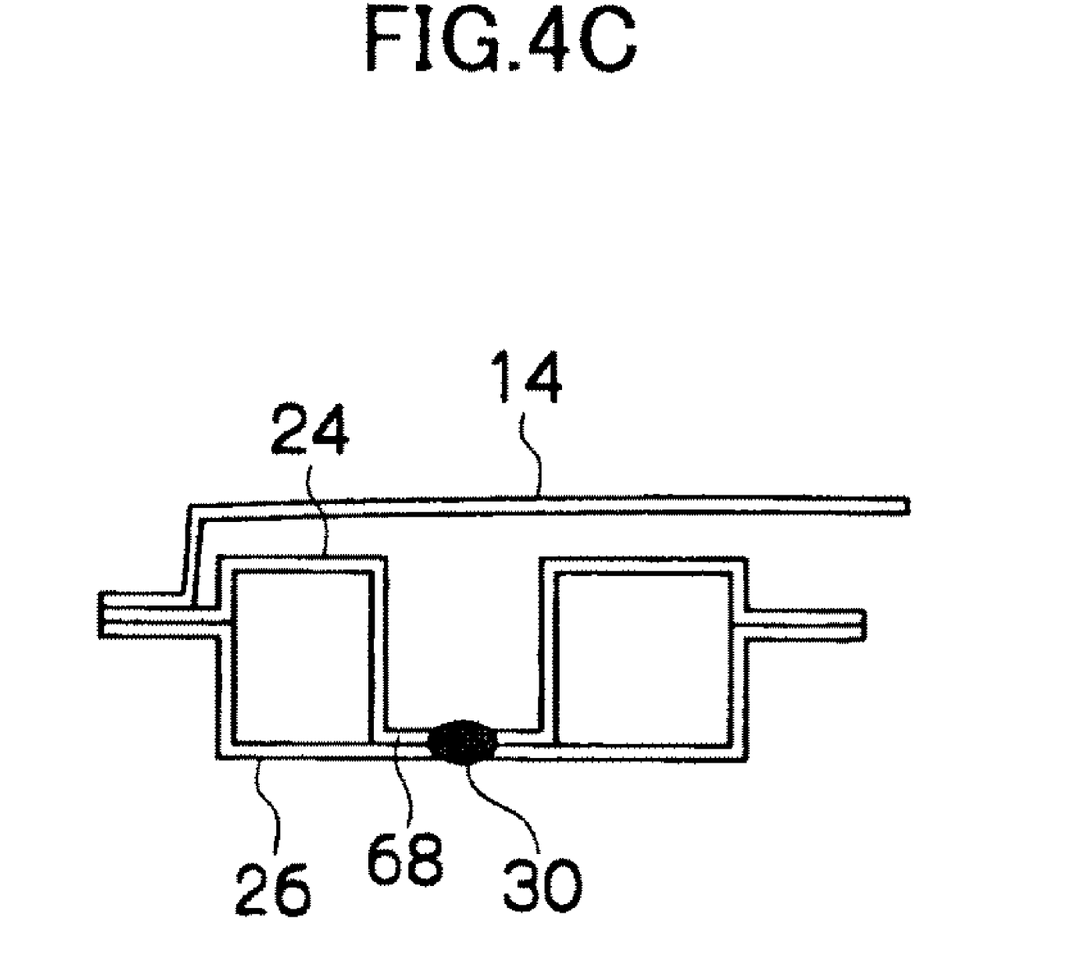
FIG. 4C is a cross-sectional view taken along line C-C in FIG. 4A, schematically illustrating the front header part pertaining to the second embodiment of the present invention.
Figure 4D:
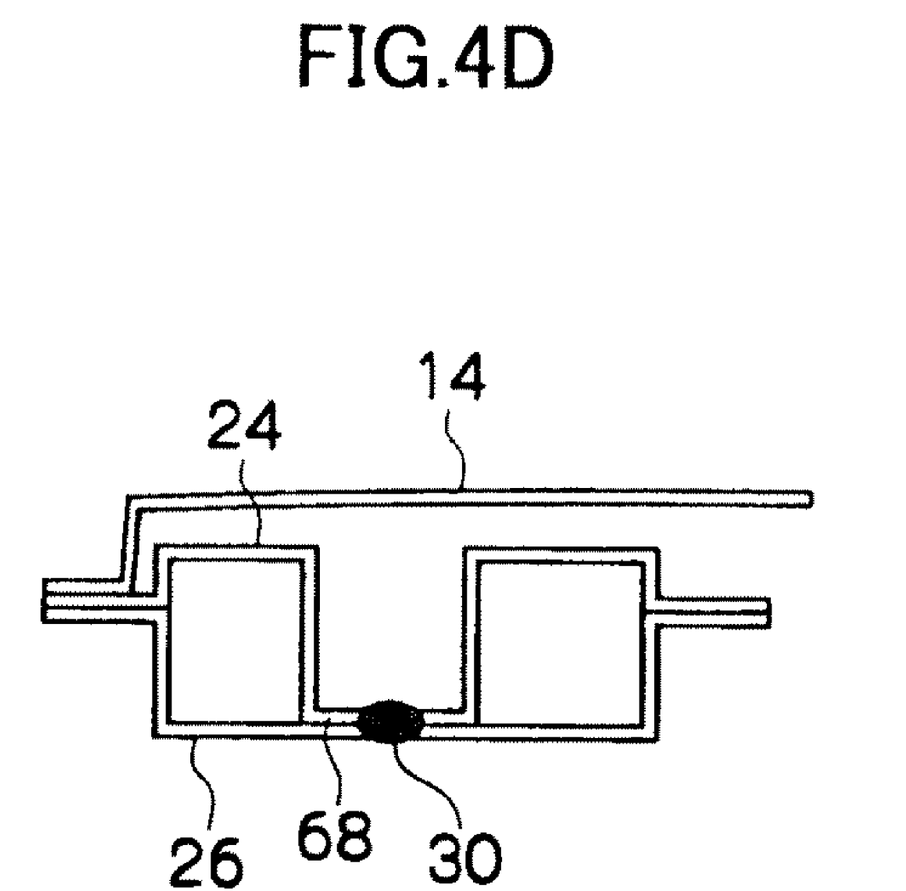
FIG. 4D is a cross-sectional view taken along line D-D in FIG. 4A, schematically illustrating the front header part pertaining to the second embodiment of the present invention.
Figure 5:
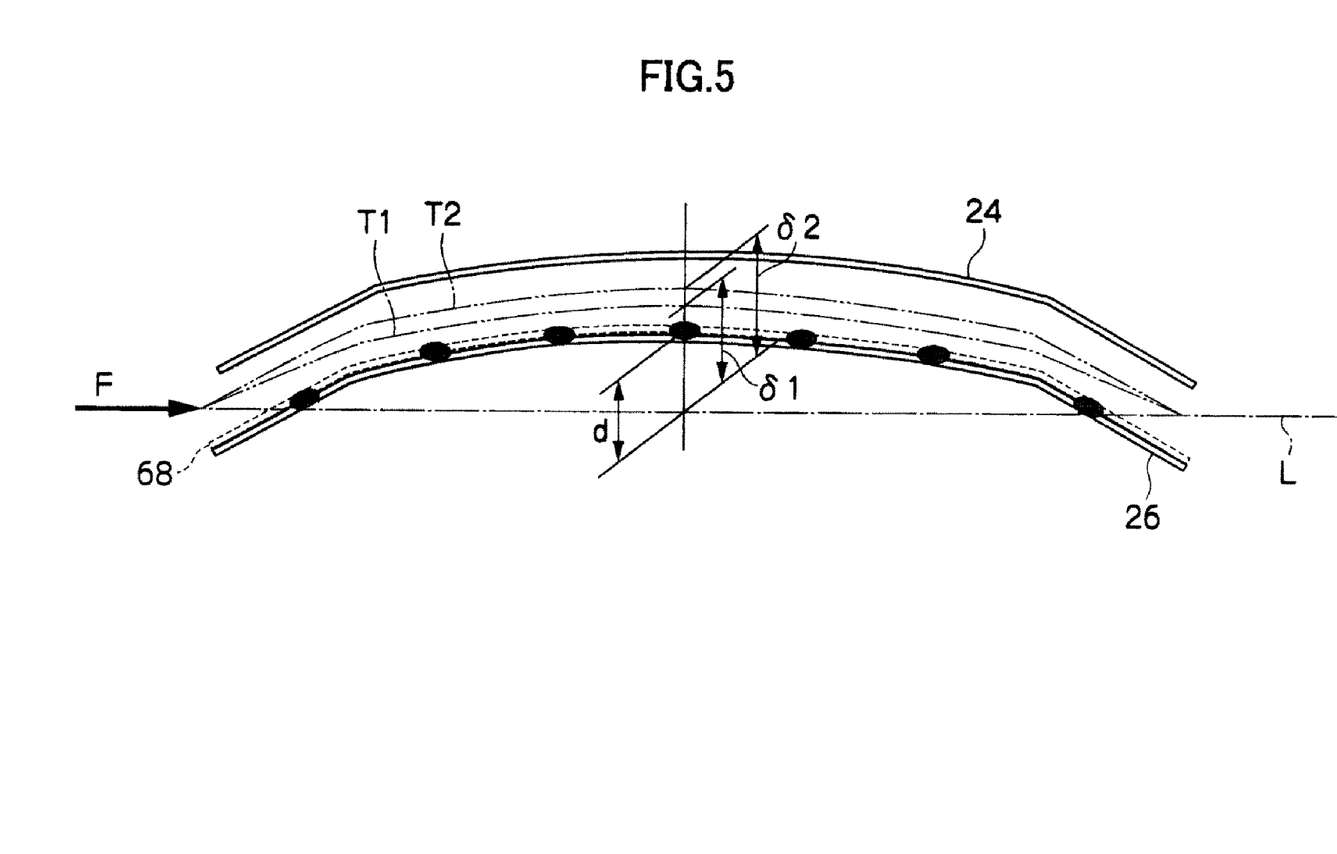
FIG. 5 is an explanatory drawing illustrating the center-of-figure location for the front header part pertaining to the second embodiment of the present invention in the case where a lateral force is applied thereto.

And, as can be seen from FIG. 4B to FIG. 4D, not only the central portion in the vehicle width direction, but also the locations on both sides are made to be a junction part 30, where the bead 68 and the lower header panel 26 are joined to each other.

Also in the second embodiment thus configured, a simple structure in which the bead 68 is provided as in the first embodiment reinforces the front header part 62, being capable of preventing an undesired deformation from being caused by an external force.

In addition, as compared to the first embodiment, the bead 68 is joined to the lower header panel 26 at more junction parts 30, which allows effective reinforcement. On the other hand, providing the junction part 30 at only one place as in the first embodiment will lessen the number of manufacturing processes.

In the above description, the configuration is that in which the bead 28 or bead 68 protrudes downward from the upper header panel 24, however, the configuration for reinforcing the front header part 22 is not limited to this. For example, even with the configuration in which the bead 28 protrudes upward from the upper header panel 24, reinforcement is achieved, as compared to the configuration in which no bead 28 is provided. In addition, the lower header panel 26 may be provided with a bead which protrudes upward or downward.

However, providing a downward protruding bead for the lower header panel 26 will make it difficult to allocate a wide space inside the vehicle cabin. In addition, if an upward protruding bead is provided for the upper header panel 24 or the lower header panel 26, the center-of-figure location will be raised. Therefore, as described above, in order to lower the center-of-figure location for the front header part for reliably assuring reduction in stress when a lateral force F, or the like, is applied, it is preferable to provide a downward protruding bead for the upper header panel 24.

The object to which the present invention is applicable is not limited to the front header part 22. For example, as shown in FIG. 1, it may be the rear header part 32, in short, the roof header structure of the present invention is applicable to any roof header part made up of a plurality of header panels.

In addition, the number of header panels constituting the roof header part is not limited to two as described above (the upper header panel 24 and the lower header panel 26). Even if the roof header part is constituted by a single, or three or more header panels, the present invention is applicable.

EXPLANATION OF REFERENCE NUMERALS AND SIGNS IN THE DRAWINGS

12 Automobile
14 Roof
16 Font pillar
22 Front header part
24 Upper header panel
26 Lower header panel
28 Bead
30 Junction part
32 Rear header part
62 Front header part
68 Bead

The invention claimed is:

1. A roof header structure, comprising:
a roof panel;
a lower header panel;
an upper header panel attached to the roof panel and the lower header panel and being between the roof panel and the lower header panel; and
a bead provided at the upper header panel and continuing in a vehicle width direction, wherein:
a length of protrusion of the bead is gradually reduced from a central portion to end portions in the vehicle width direction;
the lower header panel includes two linear portions connected by a convex portion;
the convex portion of the lower header panel is attached to the bead at multiple weld points; and
portions of the convex portion positioned outward of the outermost weld points in the vehicle width direction do not contact the bead.

2. The roof header structure of claim 1, wherein:
the bead protrudes toward the lower header panel from the upper header panel, and the bead is joined to the lower header panel at a side in a direction of protrusion.

3. The roof header structure of claim 1, wherein:
the header panels are formed to curve convexly upward in the vehicle width direction; and
the bead protrudes downward.

4. The roof header structure of claim 1, wherein:
the bead protrudes toward the lower header panel from the upper header panel, and the bead protrudes such that the bead contacts with the lower header panel at a side in a direction of protrusion, over a range extending in the vehicle width direction.

5. The roof header structure of claim 4, wherein the bead is joined to the lower header panel at a center in the vehicle width direction and at locations at either side thereof.

6. A roof header structure, comprising:
a plurality of header panels provided vertically with spaces between them; and
a bead provided at at least one of the header panels and continuing in a vehicle width direction,
wherein the bead protrudes toward a different header panel from the header panel at which the bead is provided, and directly contacts the different header panel over the entire different header panel width direction.

* * * * *